United States Patent [19]
Kline

[11] 3,867,467
[45] Feb. 18, 1975

[54] PHENOLIC ANTIOXIDANTS

[75] Inventor: Richard H. Kline, Cuyahoga Falls, Ohio

[73] Assignee: The Goodyear Tire & Rubber Company, Akron, Ohio

[22] Filed: Dec. 9, 1971

[21] Appl. No.: 206,553

[52] U.S. Cl. .............. 260/622 R, 260/45.9, 260/810
[51] Int. Cl. ............................................. C07c 79/16
[58] Field of Search ............ 260/622 R, 624 R, 814, 260/810, 621 R, 622 R, 619 R, 45.9

[56] References Cited
UNITED STATES PATENTS
| | | | |
|---|---|---|---|
| 2,151,517 | 3/1939 | Kamlet | 260/618 |
| 3,121,732 | 2/1964 | Meier et al. | 260/465 |

OTHER PUBLICATIONS
Van der Meer, "Rubber Chem. & Tech.," Vol. 18, pp. 853, 867 and 872, (1945).
Houben-Weyl, "Methoden der Organischem Chemie," Vol. 10, No. 1, pp. 159–160, (1971).
Hass et al., "Amer. Chem. Soc.," Vol. 71, pp. 1767–1769.
Hass et al., "Amer. Chem. Soc.," Vol. 71, pp. 3482–3485.

*Primary Examiner*—Bernard Helfin
*Assistant Examiner*—W. B. Lone
*Attorney, Agent, or Firm*—F. W. Brunner; J. A. Rozmaizl

[57] ABSTRACT

Phenolic antioxidants such as 1,1-dimethyl-2-(3,5-di tert.butyl-4-hydroxyphenyl)-1-nitroethane and a method of preparing said antitoxidants involving the reaction between a 3,5-di tert.alkyl-4-hydroxybenzyl halide; N,N-dialkyl amine or dithiocarbamate such as 3,5-di tert.butyl-4-hydroxybenzyl chloride; 2,6-di tert.-butyl-4-dimethylamino-methylphenol or 3,5-di tert.butyl-4-hydroxybenzyl N,N-dimethyldithiocarbamate and a nitroalkane such as 2-nitropropane.

3 Claims, No Drawings

PHENOLIC ANTIOXIDANTS

The present invention relates to the preparation of compounds and their use as antioxidants.

Those in the field of polymer stabilization are constantly searching for new antioxidants and processes for preparing them.

It is an object of the present invention to provide a new class of antioxidants. It is also an object of the present invention to provide a process for preparing said antioxidants. Other objects will become apparent subsequently herein.

Objects of the present invention are accomplished by reacting under basic conditions, a combination comprising (A) a phenolic compound having the following structural formula:

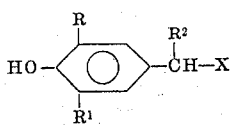

wherein R and R' are tertiary alkyl radicals having 4 to 8 carbon atoms, $R^2$ is selected from the group consisting of hydrogen and alkyl radicals having 1 to 6 carbon atoms and X is selected from the group consisting of Cl, Br,

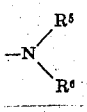

and

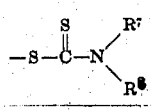

wherein $R^5$, $R^6$, $R^7$ and $R^8$ are alkyl radicals having 1 to 4 carbon atoms, and (B) a nitroalkane having the following structural formula:

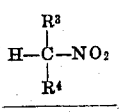

wherein $R^3$ is selected from the group consisting of hydrogen and alkyl radicals having 1 to 6 carbon atoms and $R^4$ is an alkyl radical having 1 to 6 carbon atoms.

The product of these reactions, (a nitro alkyl phenol), has the following structural formula.

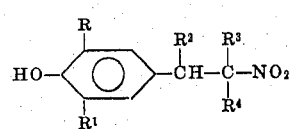

wherein R, $R^1$, $R^2$, $R^3$ and $R^4$ are as described above. These compounds can be used to stabilize polymers against oxidative degradation. They can also be reduced to amines which in turn can be reacted with an α-β unsaturated acid halide such as acryloyl chloride or methacryloyl chloride under basic conditions to produce an antioxidant capable of being polymerized in free radical polymerization systems to form self-stabilizing polymers.

Preferably R and R' are tert.butyl, $R^2$ is hydrogen, $R^3$ is hydrogen or methyl, and $R^4$ is methyl or ethyl.

Illustrative of phenolic reactants are the following:
3,5-di tert.butyl-4-hydroxybenzyl chloride
3,5-di tert.butyl-4-hydroxybenzyl bromide
2,6-di tert.butyl-4-dimethylaminomethylphenol
3,5-di tert.butyl-4-hydroxybenzyl N,N-dimethyldithiocarbamate
2,6-di tert.butyl-4-(1-chloroethyl)phenol
3,5-bis(1,1-dimethylbutyl)-4-hydroxybenzyl chloride
3,5-di tert.butyl-4-hydroxybenzyl N,N-diethyldithiocarbamate
2,6-di tert.butyl-4-piperidinomethylphenol
3,5-bis(1,1,3,3-tetramethylbutyl)-4-hydroxybenzyl chloride Illustrative of the nitroalkanes are the following: nitroethane, 1-nitropropane, 2-nitropropane, 1-nitrobutane, 2-nitrobutane, 3-nitropentane, and 1-nitrohexane.

Illustrative of the phenolic reaction products of the present invention are the following:
1,1-dimethyl-2-(3,5-di tert.butyl-4-hydroxyphenyl)-1-nitroethane
1-methyl-2-(3,5-di tert.butyl-4-hydroxyphenyl)-1-nitroethane
1-(3,5-di tert.butyl-4-hydroxybenzyl)-1-nitropropane
1-(3,5-di tert.butyl-4-hydroxybenzyl)-1-nitrobutane
2-(3,5-di tert.butyl-4-hydroxybenzyl)-2-nitrobutane
1-(3,5-di tert.butyl-4-hydroxybenzyl)-1-nitrohexane
1,2-dimethyl-2-(3,5-di tert.butyl-4-hydroxyphenyl)-1-nitroethane
1,1,2-trimethyl-2-(3,5-di tert.butyl-4-hydroxyphenyl)-1-nitroethane
1-methyl-2-ethyl-2-(3,5-di tert.butyl-4-hydroxyphenyl)-1-nitroethane
1-methyl-2-ehtyl-2-(3,5-di tert.butyl-4-hydroxyphenyl)-1-nitroethane
1-methyl-2-(3,5-bis(1,1-dimethylbutyl)-4-hydroxyphenyl)-1-nitroethane
1,1-dimethyl-2-(3,5-di tert.amyl-4-hydroxyphenyl)-1-nitroethane
1-[3,5-bis(1,1,3,3-tetramethylbutyl)-4-hydroxybenzyl]-1-nitropropane
3-(3,5-di tert.amyl-4-hydroxybenzyl)-3-nitropentane
1-methyl-2-(3,5-bis(1,1-dimethylpentyl)-4-hydroxyphenyl)-1-nitroethane
1-methyl-2-propyl-2-(3,5-di tert.butyl-4-hydroxyphenyl)-1-nitroethane Generally the (preferred) process of the present invention proceeds as follows. One equivalent of a base such as an alkali metal hydroxide is dissolved in a solvent such as methanol or ethanol and one to five equivalents of an aliphatic nitro compound are added. To this mixture is added, beginning at about room temperature, one equivalent of a 3,5-di tert.alkyl4-hydroxybenzyl chloride. The addition is carried out over a period of from 15 to 60 minutes. The reaction is exothermic with the maximum temperature being reached in the range of 40°C. to 50°C. The reaction mixture is stirred for a period of up to several hours and the product is then separated and purified following established procedures.

Polymers subject to deterioration by oxidation that can be conveniently protected by the antioxidants described herein include substituted and unsubstituted, saturated and unsaturated, natural and synthetic polymers. The oxidizable natural polymers of interest include natural rubber in its various forms, e.g., pale crepe and smoked sheet, and balata and gutta percha. The oxidizable synthetic polymers are prepared from a single monomer (homopolymer) or a mixture of two or more copolymerizable monomers (copolymers) wherein the monomers are combined in a random distribution or block form. The monomers may be substituted or unsubstituted and may possess one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methylcyclooctene. Examples of vinyl monomers are styrene, acrylonitrile, acrylic acid, ethylacrylate, butylacrylate, methyl vinyl ether, vinyl acetate and vinyl pyridine. Examples of vinylidene monomers are α-methylstyrene, methacrylic acid, methyl methacrylate, ethylmethacrylate, glycidylmethacrylate and vinylidene chloride. Representative examples of the synthetic polymers used in the practice of this invention are polychloroprene; homopolymers of a conjugated 1,3-diene such as isoprene and butadiene, and in particular, polyisoprenes and polybutadienes having essentially all of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerization product of a major porportion of a monoolefin and a minor proportion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene, ethylidene norbornene and methylene norbornene.

When added in free form normally 0.001 to 10.0 percent of the anitoxidant by weight, i.e., parts by weight based on the weight of the polymer, i.e., 100 parts by weight of the polymer can be used, although the precise amount of the antioxidant which is to be employed will depend somewhat on the nature of the polymer and the severity of the deteriorating conditions to which the polymer is to be exposed. In unsaturated polymers such as those made from conjugated dienes, the amount of age resister necessary is greater than that required by a saturated polymer such as polyethylene. It has been found that an effective antioxidant amount of the disclosed stabilizers in rubbery unsaturated polymers will generally range from 0.05 to 5.0 percent by weight, i.e., parts by weight based on the weight of the polymer, although it is commonly preferred to use from 0.5 to 3.0 percent by weight, i.e., parts by weight based on the weight of the polymer. Mixtures of the age resisters may be used.

The following examples illustrate the practice of the present invention. Unless otherwise indicated, all parts are parts by weight.

EXAMPLE 1

1,1-dimethyl-2-(3,5-di t-butyl-4-hydroxyphenyl)-1-nitroethane was prepared by heating a mixture of 26.3 grams of 2,6-di-t-butyl-4-dimethylamino methylphenol, 18.0 grams of 2-nitropropane, 1.0 grams of sodium methoxide, and 100 ml of dimethylsulfoxide at 60° C. for 14.5 hours. The reaction mixture was poured into 400 ml of water and the solid which precipitated was filtered off and allowed to dry. The crude product was then recrystallized from hexane yielding 21.0 grams (68% of theory) of product melting at 102°–104° C.

EXAMPLE 2

1,1-dimethyl-2-(3,5-di t-butyl-4-hydroxyphenyl)-1-nitroethane was prepared by adding dropwise 25.5 grams of 3,5-di t-butyl-4-hydroxybenzyl chloride to a solution of 9.8 grams of 2-nitro propane and 4.0 grams of sodium hydroxide in 100 ml of ethanol. The addition was completed in 40 minutes at 31°–43°C. The reaction mixture was stirred for 30 minutes and was then poured into 600 ml of water. The solid which precipitated was filtered off and allowed to dry. The crude product weighed 29.5 grams (96% of theory) and melted at 95°–100°C.

EXAMPLE 3

1,1-dimethyl-2-(3,5-di t-butyl-4-hydroxyphenyl)-1-nitroethane was prepared by heating at reflux for seven hours a mixture of 17.0 grams of 3,5-di t-butyl-4-hydroxybenzyl N,N-dimethyl dithiocarbamate, 4.45 grams of 2-nitropropane, 2.0 grams of sodium hydroxide, 50 ml of alcohol, and 50 ml of tetrahydrofuran. At the end of the heating period the mixture was poured into 300 ml of water and the solid which precipitated was filtered off and allowed to dry. The crude product was recrystallized from hexane. A yield of 8.6 grams (56% of theory) was obtained and the material melted at 99°–102°C.

EXAMPLE 4

1-Methyl-2-(3,5-di t-butyl-4-hydroxyphenyl)-1-nitroethane was prepared by adding 15.0 grams of nitroethane to a solution of 4.0 grams of sodium hydroxide in 100 ml of ethanol. To the resulting suspension was added dropwise 25.5 grams of 3,5-di t-butyl-4-hydroxybenzyl chloride. The addition was completed in 30 minutes at 28°–42°C. The reaction mixture was stirred for 15 minutes and was then poured into 600 ml of water. A yellow oil precipitated, which gradually crystallized on standing. The crystalline solid was filtered off, allowed to dry, and the crude product recrystallized from hexane. A yield of 21.4 grams (73% of theory) of product was obtained which melted at 68°–71°C.

EXAMPLE 5

1-(3,5-di t-butyl-4-hydroxybenzyl)-1-nitropropane was prepared by adding 26.7 grams of 1-nitropropane to a solution of 4.0 grams of sodium hydroxide in 100 ml of ethanol. To the resulting suspension was added 25.5 grams of 3,5-di t-butyl-4-hydroxybenzyl chloride. The addition was completed in 20 minutes and the maximum temperature reached during the addition was 41°C. The reaction mixture was stirred for 2½ hours and was then poured into 600 ml of water. The oil was precipitated was separated by extraction with hexane. Hexane and excess 1-nitropropane were separated from the extract by the use of a rotary evaporator. The residue was dissolved in hexane and the solution was cooled with dry ice. The solid which crystallized was filtered off and allowed to dry. The product weighed 20.0 grams and melted at 54.5°–59°C. The filtrate was worked up to yield another 6.5 grams of material melting at 51°–57°C. The total crude yield was 26.5 grams which was 86% of theory.

An SBR polymer (1006) was stabilized with two of the stabilizers of the present invention as follows. The SBR polymer was dissolved in benzene and benzene solutions of the age resisters were added to portions of the SBR solutions to provide 1.00 part of the antioxidant per 100 parts of rubbery polymer. The benzene solutions were used to form films and tested in an oxygen absorption apparatus. The testing procedure is of the type described in further detail in *Industrial and Engineering Chemistry*, Vol. 43, page 456 (1951) and *Industrial and Engineering Chemistry*, Vol. 45, page 392 (1953).

Table I

| Oxygen Absorption at 100°C. | |
|---|---|
| Antioxidant | Hours to 1% Oxygen |
| 1,1-dimethyl-2-(3,5-di t.butyl-4-hydroxyphenyl)-1-nitroethane | 253 |
| 1-methyl-2-(3,5-di t.butyl-4-hydroxyphenyl-)-1-nitroethane | 296 |

Unstabilized SBR would have an oxygen absorption value of about 5 to 10 hours. The above data therefore indicates that the compounds of the present invention do offer antioxidant protection.

Any compound within the generic descriptions recited herein could be substituted for its generic counterpart in the previous examples to produce an antioxidant or behave as an antioxidant. Likewise the other polymers described herein could be substituted for the SBR and benefit from the addition of the antioxidants.

The polymers described earlier herein will benefit by incorporation of the aforementioned antioxidants whether the polymer is vulcanized or unvulcanized and whether it is uncompounded or contains compounding ingredients such as carbon black, vulcanization agents and accelerators.

The antioxidants can be incorporated according to any conventional compounding technique, e.g., by milling, banburying or addition to polymer latices or polymer solutions or suspensions. The method of incorporation is not critical to the practice of the present invention.

While certain representative embodiments and details have been shown for the purpose of illustrating the invention, it will be apparent to those skilled in this art that various changes and modifications may be made therein without departing from the spirit or scope of the invention.

What is claimed is:

1. A compound having the following structural formula:

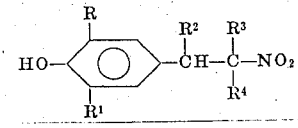

wherein R and $R^1$ are tertiary alkyl radicals having 4 to 8 carbon atoms, $R^2$ and $R^3$ are selected from the group consisting of hydrogen and alkyl radicals having 1 to 6 carbon atoms and $R^4$ is an alkyl radical having 1 to 6 carbon atoms.

2. A compound according to claim 1 selected from the group consisting of 1,1-dimethyl-2-(3,5-di t.butyl-4-hydroxyphenyl)-1-nitroethane; 1-methyl-2-(3,5-di t.butyl-4-hydroxyphenyl)-1-nitroethane and 1-(3,5-di t.butyl-4-hydroxybenzyl)-1-nitropropane.

3. The compound of claim 1 wherein R and $R^1$ are tertiary butyl radicals, $R^2$ is hydrogen and $R^3$ and $R^4$ are methyl radicals.

* * * * *